United States Patent
Gosain et al.

(10) Patent No.: US 12,504,997 B2
(45) Date of Patent: Dec. 23, 2025

(54) RING ARCHITECTURE-BASED WORKLOAD DISTRIBUTION IN A MICROSERVICE COMPUTING ENVIRONMENT

(71) Applicant: Dell Products L.P., Round Rock, TX (US)

(72) Inventors: Rohit Gosain, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 755 days.

(21) Appl. No.: 17/947,274

(22) Filed: Sep. 19, 2022

(65) Prior Publication Data

US 2024/0095092 A1 Mar. 21, 2024

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/4557* (2013.01)

(58) Field of Classification Search
CPC .............. G06F 9/5077; G06F 9/45558; G06F 2009/4557
See application file for complete search history.

(56) References Cited

U.S. PATENT DOCUMENTS

| | | | |
|---|---|---|---|
| 2019/0179720 A1* | 6/2019 | Chen ................ | G06F 9/485 |
| 2021/0136133 A1* | 5/2021 | Ithal ................ | H04L 9/3242 |
| 2022/0014459 A1* | 1/2022 | Ganguli ............. | G06F 9/544 |
| 2022/0385725 A1* | 12/2022 | Ferraro ............. | G06F 9/5066 |
| 2023/0376335 A1* | 11/2023 | Chen ................ | G06F 9/4418 |

OTHER PUBLICATIONS

The Linux Foundation, "What is Kubernetes?" https://kubernetes.io/docs/concepts/overview/what-is-kubernetes/, Oct. 22, 2020, 4 pages.
Vmware Inc. "Microservices," https://spring.io/microservices, Accessed Jan. 14, 2021, 4 pages.
Vmware Inc. "VMware Tanzu," Solution Brief, Jan. 2021, 3 pages.
S. Sugob, "The Twelve-Factor App—A Successful Microservices Guideline," https://medium.com/hiredevops-org/the-twelve-factor-app-a-successful-microservices-guideline-497f45aac506, Feb. 28, 2019, 7 pages.
Wikipedia, "Kubernetes," https://en.wikipedia.org/wiki/Kubernetes, Sep. 5, 2022, 17 pages.
Wikipedia, "Microservices," https://en.wikipedia.org/wiki/Microservices, Aug. 29, 2022, 13 pages.

* cited by examiner

*Primary Examiner* — Brian W Wathen
(74) *Attorney, Agent, or Firm* — Ryan, Mason & Lewis, LLP (57) ABSTRACT

Techniques are disclosed for managing workloads in data processing systems. For example, a method determines a set of containers for processing a given workload of data records, wherein each container of the set of containers is configured to process a given subset of the data records. The method causes deployment of the set of containers in a ring configuration to process the given workload of data records such that at least one of the containers in the ring configuration automatically processes one or more data records of a subset of data records assigned to another container in the ring configuration that becomes inactive.

20 Claims, 11 Drawing Sheets

| Service Instance | From Record set | To Record set | Service status |
|---|---|---|---|
| MS1 | 1 | 20K | Active |
| MS2 | 20K+1 | 40K | Active |
| MS3 | 40K+1 | 60K | Active |

FIG. 6B — 604

| Service Instance | From Record set | To Record set | Service status |
|---|---|---|---|
| MS1 | 1 | 20K | Active |
| MS2 | 20K+1 | 40K | Not Active |
| MS3 | 40K+1 | 60K | Active |

FIG. 6C — 606

| Service Instance | From Record set | To Record set | Service status |
|---|---|---|---|
| MS1 | 1 | 20K | Not Active |
| MS2 | 20K+1 | 40K | Active |
| MS3 | 40K+1 | 60K | Active |

RING ARCHITECTURE-BASED WORKLOAD DISTRIBUTION IN A MICROSERVICE COMPUTING ENVIRONMENT

FIELD

The field relates generally to information processing systems, and more particularly to workload management in such information processing systems.

BACKGROUND

Microservices are the predominant approach in the modern development of software (e.g., application programs, or more simply, applications) across a wide variety of computing platforms such as, but not limited to, a cloud computing platform, a private computing platform, a hybrid (cloud/private) computing platform, an edge computing platform, etc. A microservice architecture manages an application as a collection of services. As such, development of an application can be accomplished in a flexible and scalable manner.

Initially, microservices were used in application programming interface (API) environments where synchronous/asynchronous request calls occur (e.g., web applications). However, microservices are now used in Docker and Kubernetes container environments, as well as for batch processing in data pipeline and other data processing architectures. Typically, in a data pipeline system, there are multiple datastores (stores) where data for a given job (workload) is read from a source datastore, transformed and (possibly, as needed/desired) stored in an intermediate datastore, and then ultimately loaded onto a destination datastore. Then, another given job is similarly processed from the source datastore through to the destination datastore.

In batch processing (i.e., wherein a job/workload is scheduled and runs in a specific interval), parallel threads (processors) are typically enabled to execute the data faster in both virtual machine and physical server environments. However, in parallel processing, there can be use cases where different threads process the same data causing duplicate entries or corrupted data in the destination datastore.

SUMMARY

Illustrative embodiments provide improved techniques for managing workloads in data processing systems.

For example, in an illustrative embodiment, a method comprises the following steps. The method determines a set of containers for processing a given workload of data records, wherein each container of the set of containers is configured to process a given subset of the data records. The method causes deployment of the set of containers in a ring configuration to process the given workload of data records such that at least one of the containers in the ring configuration automatically processes one or more data records of a subset of data records assigned to another container in the ring configuration that becomes inactive.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments distribute microservice containers in a ring architecture (ring model) to execute records in a given workload in a given direction around the ring architecture such that, if one microservice container fails, the next microservice container in the ring architecture automatically processes records of the failed microservice container.

These and other illustrative embodiments include, without limitation, apparatus, systems, methods and computer program products comprising processor-readable storage media.

DETAILED DESCRIPTION

As mentioned, batch processing systems have been used to process workloads associated with microservices or other job execution applications. However, in batch processing systems that use parallel processing, there can be use cases where different threads process the same data causing duplicate entries or corrupted data in the destination datastore. So, typically, a different data set (block) is assigned for each thread for processing.

For example, assume 60,000 (60K) records are to be processed, and a system instantiates (spins) three parallel threads and assigns the first 20K records (block comprising records 1 to 20K) to the first thread, the next 20K records (block comprising records 20K+1 to 40K) to the second thread, and the last 20K records (block comprising records 40K+1 to 60K) to the third thread. Assume the records need to be processed sequentially to avoid data corruption, while the processing logic in each thread is the same. Now, further assume a thread fails. A retry mechanism can be used and, to avoid clogging, a circuit breaker pattern can be implemented. However, the records of the failed thread will not get processed and no other service will automatically take the job. That is, conventional approaches rely on a manual intervention to attempt to resolve the issue and re-run the thread. However, such a conventional approach can adversely impact the data pipeline system.

Figure 1:
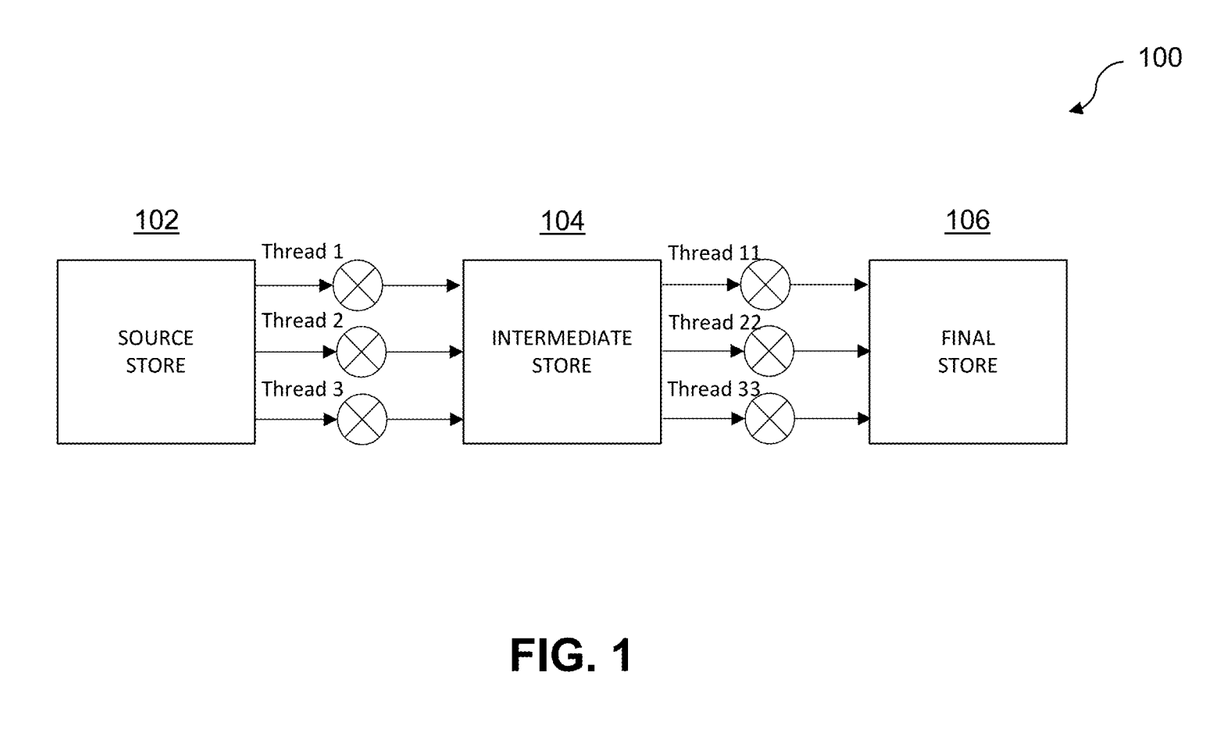
FIG. 1 illustrates an exemplary batch processing-based computing environment.

This concept is generally illustrated in a computing environment 100 of FIG. 1. As shown, a source store (datastore)

102 is operatively coupled to an intermediate store 104, which is operatively coupled to a final store 106. In batch processing, parallel threads execute the workload as the data passes from source store 102 to intermediate store 104 (e.g., threads 1, 2, and 3) and then to final store 106 (e.g., threads 11, 22, and 33). In this non-limiting example, each thread processes a data subset (block) of a larger data set. That is, between source store 102 and intermediate store 104, thread 1 processes a first subset of records (e.g., first 20K of 60K records), thread 2 processes a second subset of records (e.g., next 20K of 60K records), and thread 3 processes a third subset of records (e.g., last 20K of 60K records). Then, between intermediate store 104 and final store 106, additional threads may process some subsets of the processed data stored at intermediate store 104, e.g., thread 11 processes a first subset of records (e.g., first 10K records), thread 22 processes a second subset of records (e.g., next 10K records), and thread 33 processes a third subset of records (e.g., last 10K records). It is assumed that the logic in each of threads 1, 2, and 3 is the same, while the logic in each of threads 11, 22, and 33 is the same. Also, it is to be understood that the logic of threads 1, 2, and 3 can be the same as or different than the logic of threads 11, 22, and 33.

Figure 2:
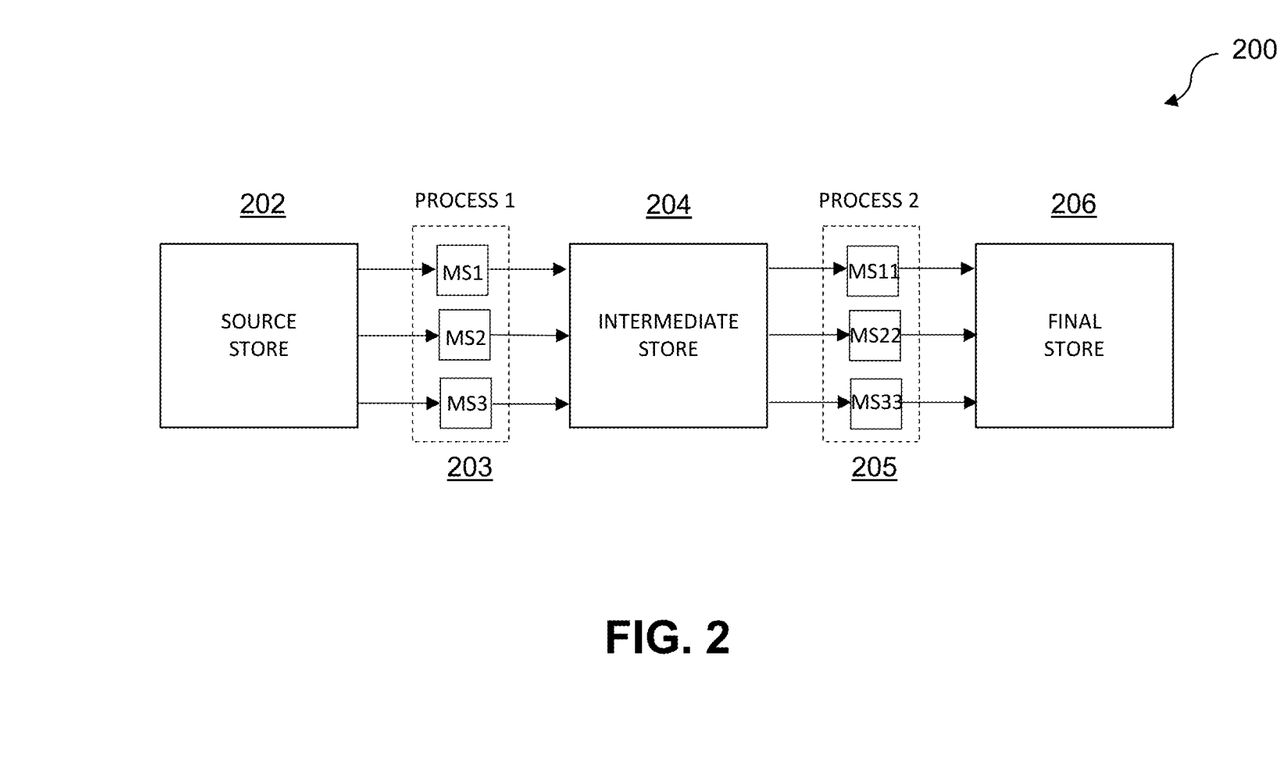
FIG. 2 illustrates an exemplary container-based computing environment.

In a container-based implementation, as generally depicted in a computing environment 200 of FIG. 2, each thread can be implemented as a microservice executing in a different container (i.e., the squares representing the containers). More particularly, as shown, a source store 202 is operatively coupled to an intermediate store 204, which is operatively coupled to a final store 206. Threads 1, 2, 3, 11, 22, and 33 of FIG. 1 are respectively depicted as microservices (MS) 1, 2, 3, 11, 22, and 33 in FIG. 2, with each MS being processed in its own container. Note that the microservices MS1, MS2, and MS3 executed between source store 202 and intermediate store 204 are collectively referred to as Process 1 (203), while the microservices MS11, MS22, and MS33 executed between intermediate store 204 and final store 206 are collectively referred to as Process 2 (205). It is assumed here that each container associated with MS1, MS2, and MS3 has the same microservice deployed (only the name associated with the container is different), while each container associated with MS11, MS22, and MS33 has the same microservice deployed (only the name associated with the container is different). As mentioned, MS1, MS2, MS3, MS11, MS22, and MS33 can be different instances of the same microservice. Each container loads different record sets from one stage and transforms and loads them to the next stage.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based environment comprised of components referred to as pods, nodes and clusters, as will be further explained below. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (application). By way of example only, such applications may include both newly architected stateless or inherently redundant scale-out applications, as well as existing stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a control plane node. By way of example, pods represent the respective processes running on a cluster.

In a Kubernetes container orchestration environment with autoscaling functionality, new pods are spun, and a system administrator cannot assign different sets of records (record sets or record blocks) to different pods individually, as there is no direct access to an individual pod. Thus, a system administrator deploys the same microservice in three different nodes and assigns the record set to each node, while disabling autoscaling functionality to avoid parallelism inside a given record set.

Figure 3:
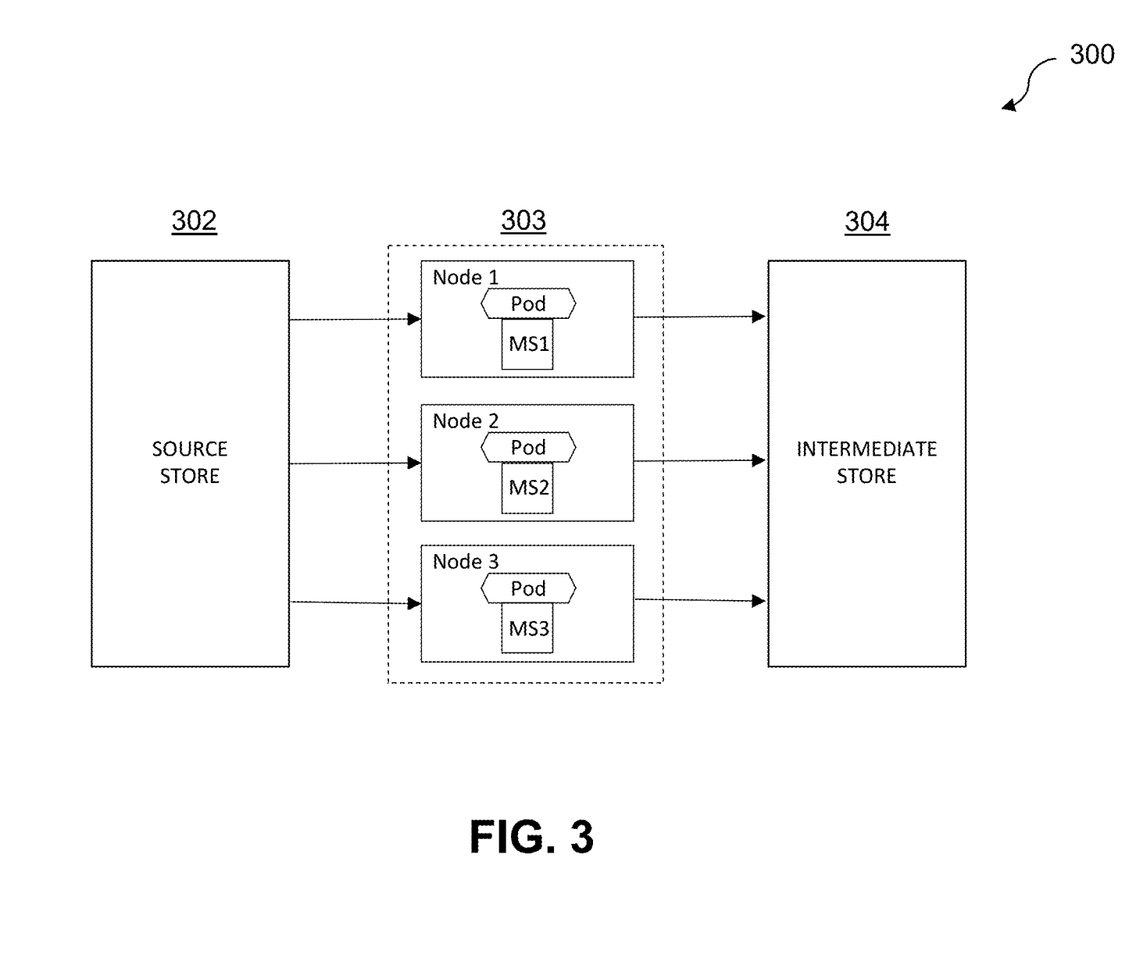
FIG. 3 illustrates an exemplary pod-based computing environment.

This concept is generally illustrated in a computing environment 300 of FIG. 3. As shown, a source store 302 is operatively coupled to an intermediate store 304 with MS1 executing in a pod in node 1, MS2 executing in a pod of node 2, and MS3 executing in a pod of node 3, collectively labeled as a cluster 303.

Thus, as depicted in computing environment 300, MS1, MS2 and MS3 are the same microservices deployed in different containers respectively executing on different pods of a cluster to mimic a controlled parallel process such that each container/pod processes different record sets from source store 302.

Now assume that MS2 fails. In response, a retry mechanism can be attempted. However, while the microservice is down, the records assigned to that microservice will not get processed and no other microservice will automatically take that work on. As a result, in a conventional approach, a system administrator needs to perform a manual intervention to fix the issue and re-run the microservice. This can have significant negative effects on the computing environment as including, but not limited to, time deadline misses, resource mismanagement, cost overruns, etc.

Figure 4:
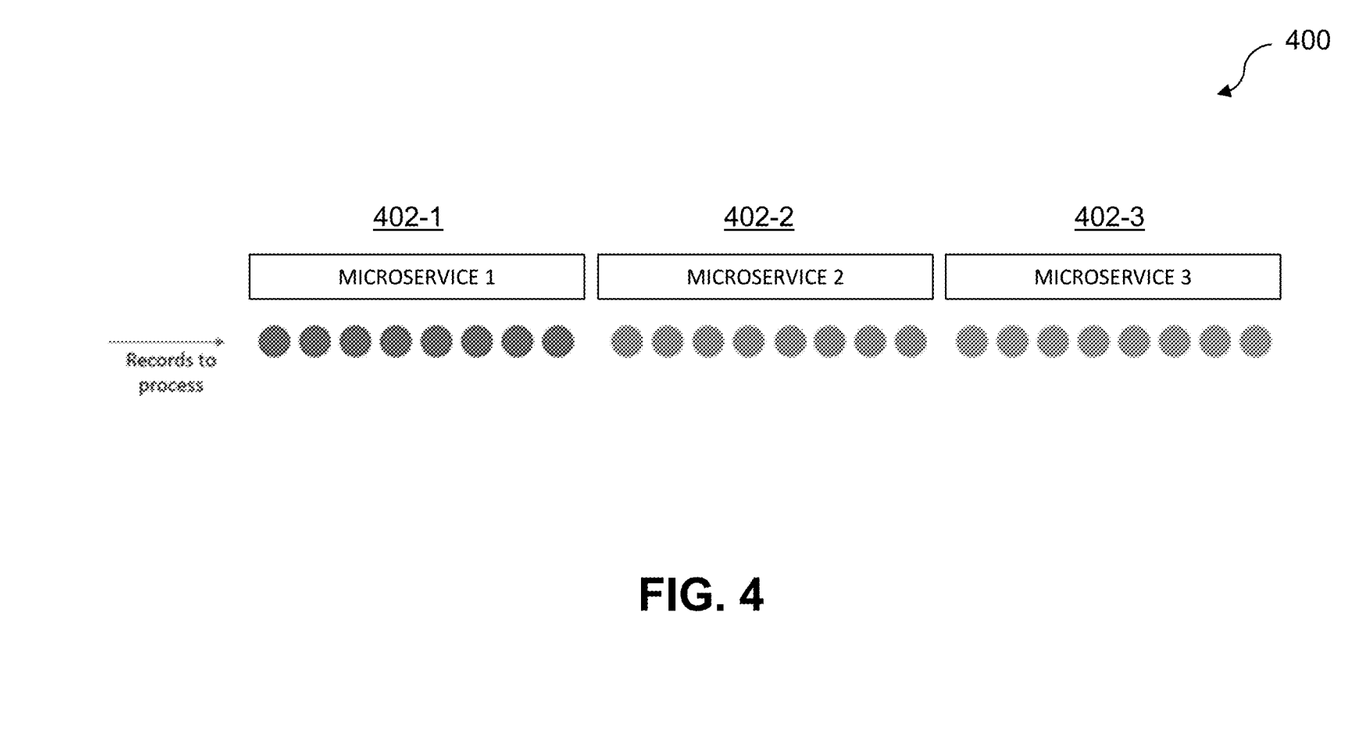
FIG. 4 illustrates a linear-based microservices computing environment.

To further illustrate the technical issues, assume a computing environment 400 in FIG. 4 manages microservice 1 (402-1), a microservice 2 (402-2) and a microservice 3 (402-3) as different container deployments of the same logic (i.e., the same microservice deployed with a different name) and assigns the workload boundary linearly. In a conventional approach, the system administrator assigns a record set to each microservice which then, collectively, process the entire workload in a linear manner.

If the second container/thread fails (microservice 2), the record sets assigned thereto (records of record set are circles depicted under microservice 2) fail to process, and the other microservices will not automatically handle the unprocessed records assigned to microservice 2. This leads to a manual intervention by a system administrator to fix microservice 2 and then to redeploy and restart the microservice to process the workload request (processing the assigned record set). In a critical workload use case, a system administrator cannot afford to take time to fix and re-run the failed microservice.

Illustrative embodiments address the above and other technical challenges in container-based microservice platforms such as, but not limited to, a Kubernetes platform. For example, illustrative data processing system embodiments provide improvements in batch job execution platforms by maintaining records to be processed in a ring architecture and assessing how many threads/containers are needed for processing. Then, the system distributes the different containers in the ring architecture to execute all records (given workload of data records) in a given direction around the ring, e.g., a clockwise direction. So, if one microservice container fails, the next microservice container in the ring architecture will automatically process the workload. Illustrative embodiments also enable a user to specify a predetermined time to complete a specific job using the fault-tolerant ring architecture.

More particularly, in contrast to the linear model of conventional workload management approaches (as described above), illustrative embodiments assess the number of microservice containers needed to process all records in the overall job, and provide a ring model for distributing workloads to be processed. Then, the microservice is distributed to multiple containers in a ring (circular) architecture for processing in the required/desired interval. For example, the microservice containers start processing records in a clockwise direction, until no further records for processing are found. As such, if a microservice container fails, another one of the microservice containers will process those records automatically.

Figure 5:
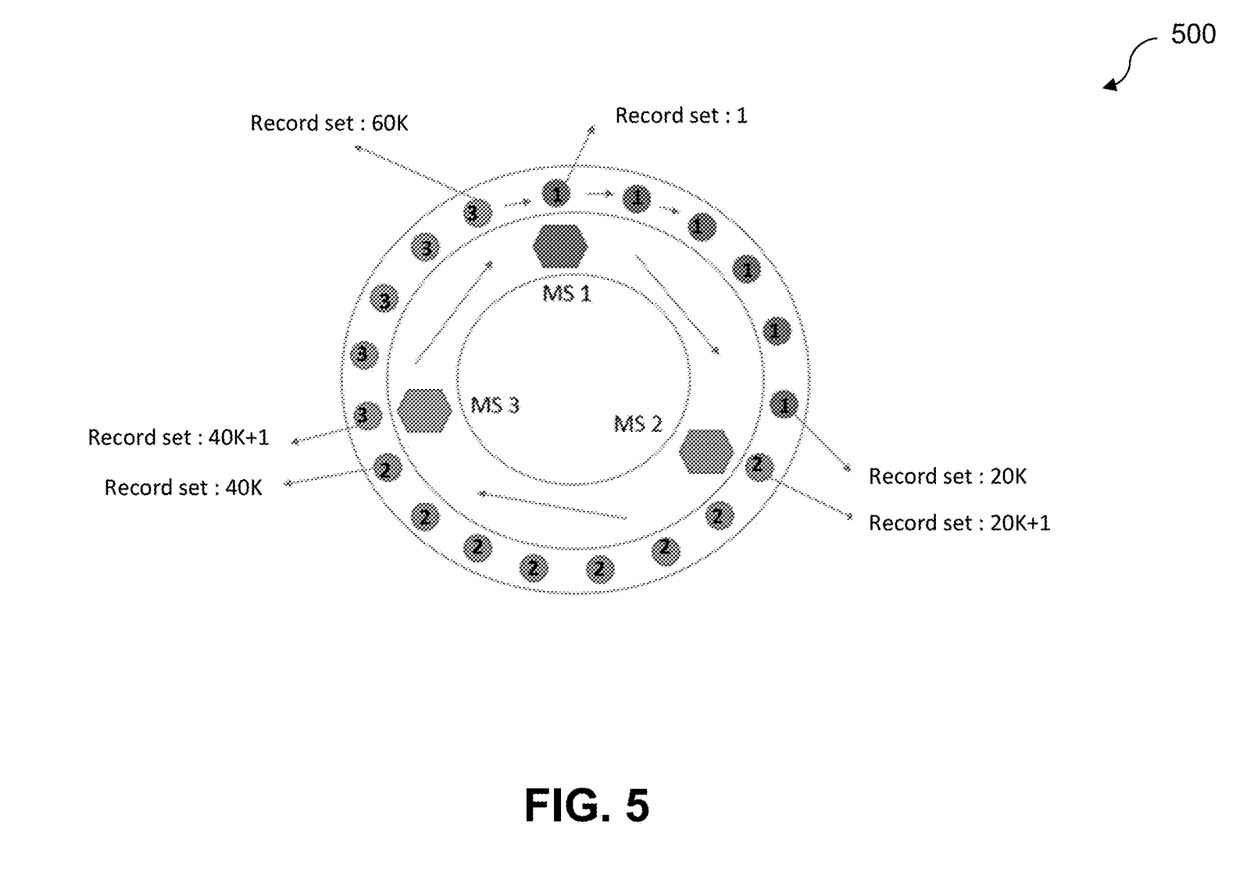
FIG. 5 illustrates a ring model for microservice computing according to an illustrative embodiment.
Figure 6A:
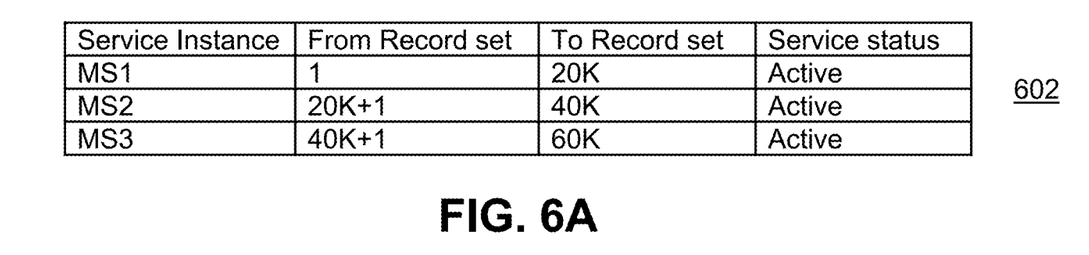
FIGS. 6A through 6C illustrate a tabular example of ring architecture-based microservice computing according to an illustrative embodiment.
Figure 6B:
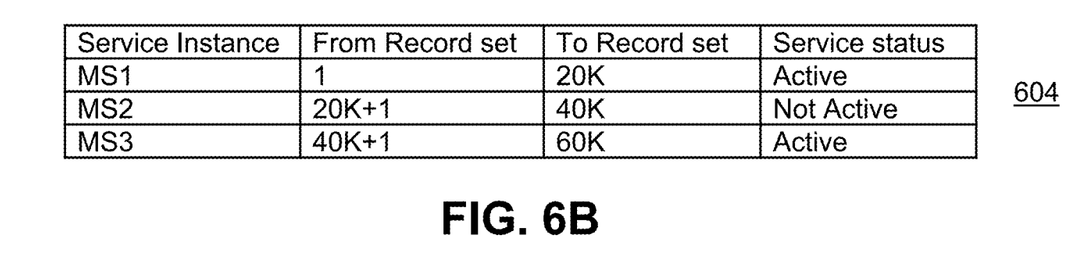
Figure 6C:
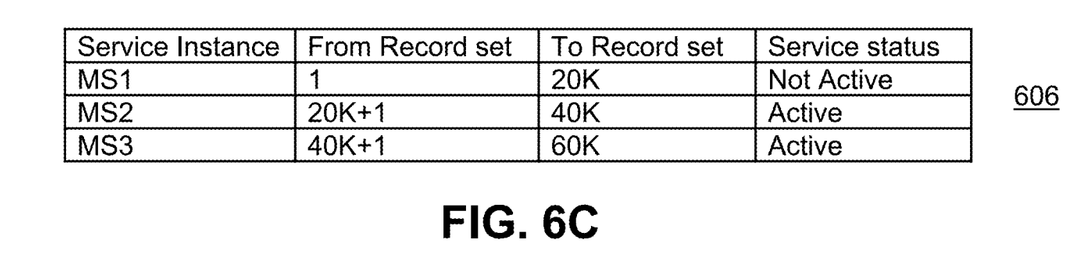

This concept is illustrated in FIG. 5 as a ring model 500 for microservice computing according to an illustrative embodiment. FIGS. 6A through 6C tabularly illustrate some of the steps associated with the ring model 500 of FIG. 5. The terms ring model and ring architecture can also be more generally referred to herein as a "ring configuration."

As shown in ring model 500, records are distributed in a ring-based manner with record set movement occurring in the same circular direction, e.g., clockwise. The system assesses the records to be executed keeping in mind the record sets that are to be executed in sequence and the total time allowed to execute all records. Assume the same example as described above of an entire data set comprised of 60K records where three record sets are identified and are to be executed in parallel. The three record sets are identified as: record 1 to record 20,000 (20K); record 20,001 (20K+1) to record 40,000 (40K); and record 40,001 (40K+1) to record 60,000 (60K). Thus, the entire data set (given workload of data records) to be processed is 60K records, with each data subset comprising 20K records.

In one illustrative embodiment, assume the system spins three threads, deploys three Docker containers of the same microservice image, and instantiates three pods in three different nodes of a Kubernetes cluster. The threads/containers are distributed in an appropriate node processing location of the assigned pods. Each microservice instance/container gets a next record to process as the records move clockwise in the ring architecture. In other words, each microservice/container executes the record set available in a clockwise direction until there is no longer a next record to process.

It is to be understood that, in illustrative embodiments, the system records the assignments and state of service as shown in table 602 of FIG. 6A.

The system then starts executing the data pipeline process. Assume, as shown in table 602, that all service instances have a service status of active. When MS1 reaches record 20K, it tries to get the next record. It may be that, at that time, MS1 could conceivably get the 35Kth record if MS2, which is executing from 20K+1 to 40K, is currently executing 35K−1th record. Since the 35Kth record belongs to MS2 and MS2 is active, MS1 stops executing as the system knows MS2 is taking care of its own remaining records. It is to be understood that if there is no sequence processing issue within a record set (i.e., if record 35K does not have to be processed after record 35K−1 completes processing and before record 35K+1 starts processing), the system can allow MS1 to execute 35K and onwards, in order to speed up the process by allowing both MS1 and MS2 to execute parts of the second block.

Assume now that MS2 fails and therefore stops executing records (i.e., MS2 is down). The system updates the service state of MS2 as not active (inactive). This is shown in table 604 of FIG. 6B. In this case, MS1 executes until record 20K is completed and, being configured to look for the next record, checks the service status table to see that MS2 is inactive. MS1 will then start executing the records of the record set that MS2 was responsible for processing before going down, i.e., records from 20K+1 to 40K, until it does not get a next record. Thus, advantageously due to the system architecture implementing ring model 500, MS1 automatically processes the records to be executed by the inactive MS2.

Assume now that MS1 fails and therefore stops executing records (i.e., MS1 is down). The system updates the service state of MS1 as not active (inactive), while MS2 and MS3 are active. This is shown in table 606 of FIG. 6C. In this case, MS3 executes until record 60K is completed and, being configured to look for the next record, checks the service status table to see that MS1 is inactive. MS3 will then start executing the records of the record set that MS1 was responsible for processing before going down, i.e., records from 1 to 20K, until it does not get a next record. Thus, advantageously due to the system architecture implementing ring model 500, MS3 automatically processes the records to be executed by the inactive MS1.

Although not expressly shown in the service status tables of FIGS. 6A-6C, if MS3 becomes inactive, MS2 would process the records assigned to MS3 after completing the processing of its own records. In alternative scenarios, an active MS can start processing records of a record set assigned to an inactive MS at any point within the record set that the inactive MS went down.

Figure 7:
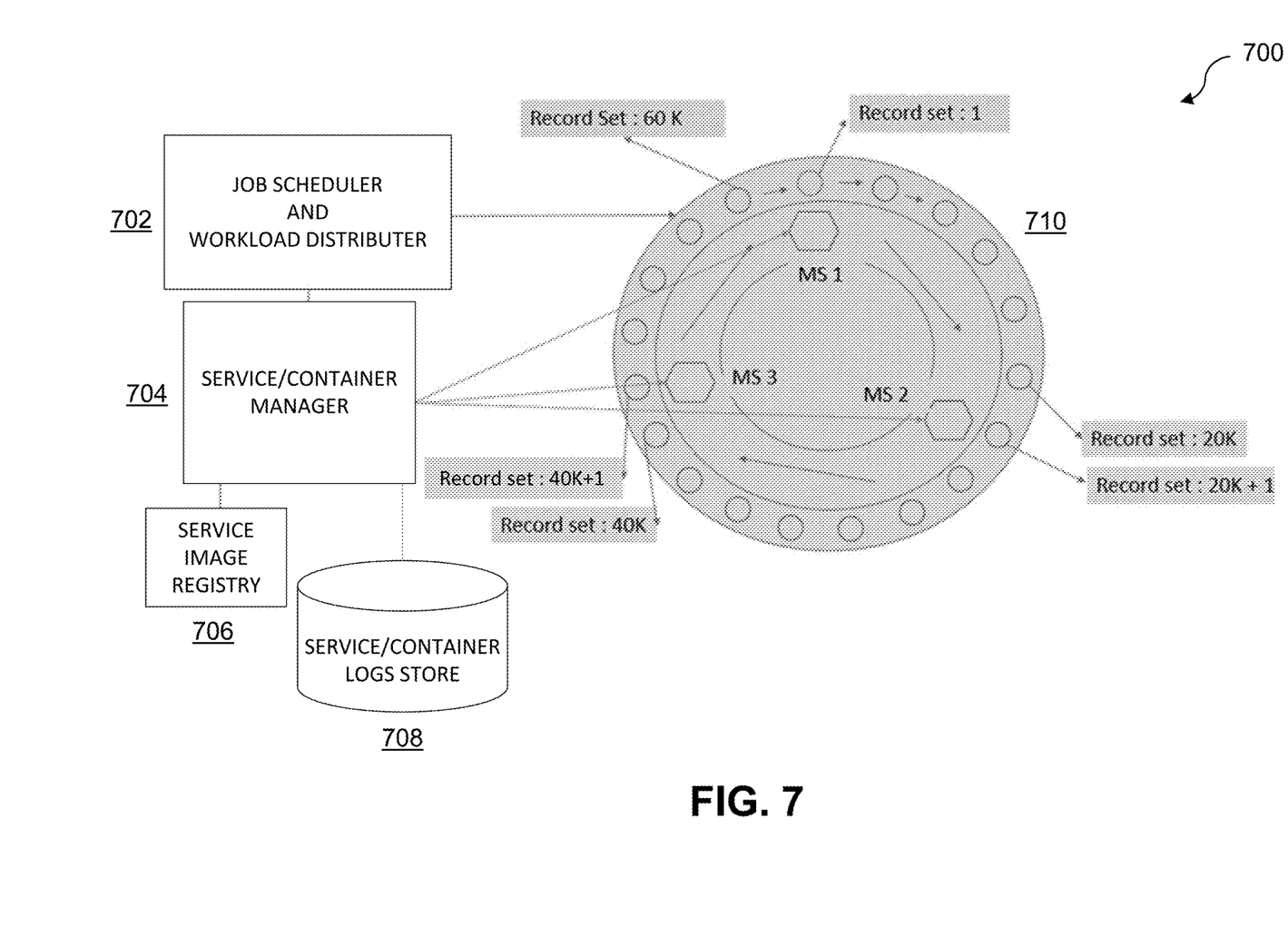
FIG. 7 illustrates a ring architecture-based microservice computing system according to an illustrative embodiment.

Referring now to FIG. 7, a ring architecture-based microservice computing system 700 (system 700) according to an illustrative embodiment is shown. More particularly, system 700 comprises several modules configured to perform functions described herein including a job scheduler and workload distributer 702, a service/container manager 704, a service image registry 706, a service/container logs store 708, and a ring model 710 (configured the same as ring model 500 described above in the context of FIG. 5).

In one or more illustrative embodiments, job scheduler and workload distributer 702 is configured to schedule the workload to be run by system 700 (e.g., daily at 4 pm, or daily between 4 pm and 8 am, etc.). At some predetermined time before running the workload (e.g., ten minutes, etc.), job scheduler and workload distributer 702 assesses the number of records to be run in the workload and determines the number of blocks of records to be executed in parallel. Job scheduler and workload distributer 702 also notes (e.g., marks) whether a record set requires parallelism or not, as this can influence whether an MS in the ring model 710 can start at some point within another MS's record set or has to start at the beginning of the record set.

The information assessed/determined by job scheduler and workload distributer 702 is passed to service/container manager 704. Service/container manager 704 is configured to, according to the number of record sets, create the microservice instances (in this example, MS1, MS2, and MS3) based on a standardized service image template from service image registry 706. Each microservice is instantiated with the configuration parameter of "starting record set number," e.g., MS1 is configured to start at record 1, MS2 is configured to start at record 20K+1, and MS3 is configured to start at 40K+1. Service/container manager 704 also maintains the service status of each microservice/container instance it spins. That is, if any microservices is down, service/container manager 704 marks the microservice instance as not active and denotes the last record successfully executed by the microservice instance before going down. In one or more illustrative embodiments, service/container manager 704 maintains the service status and last record processed in service/container logs store 708 (e.g., data structures such as tables 602, 604, and 606 or other data structures can be updated by service/container manager 704 and stored in service/container logs store 708).

Once one of the microservice instances (MS1, MS2, MS3) finishes its assigned job and seeks a next one, given that microservice instances get records to be executed in a clockwise direction in the ring model 710, service/container manager 704 provides the information about the actual service status, i.e., whether it is inactive (e.g., paused, stopped, down, failed, offline, etc.) or active (e.g., up, on, processing, online, etc.).

It is to be appreciated that some workloads/jobs are required to be completed within a predetermined time range and/or by a given deadline. As such, in one or more illustrative embodiments, system 700 is further configured to assess and deploy the required/desired (e.g., best, optimal, appropriate, sufficient, etc.) number of microservice containers for processing a workload/job in a predetermined time.

By way of example, batch processing is typically executed as a job that comprises: read a record from a datastore or queue (source store) apply a data transformation (microservice) write the updated record in a target datastore (intermediate or final store).

Figure 8A:
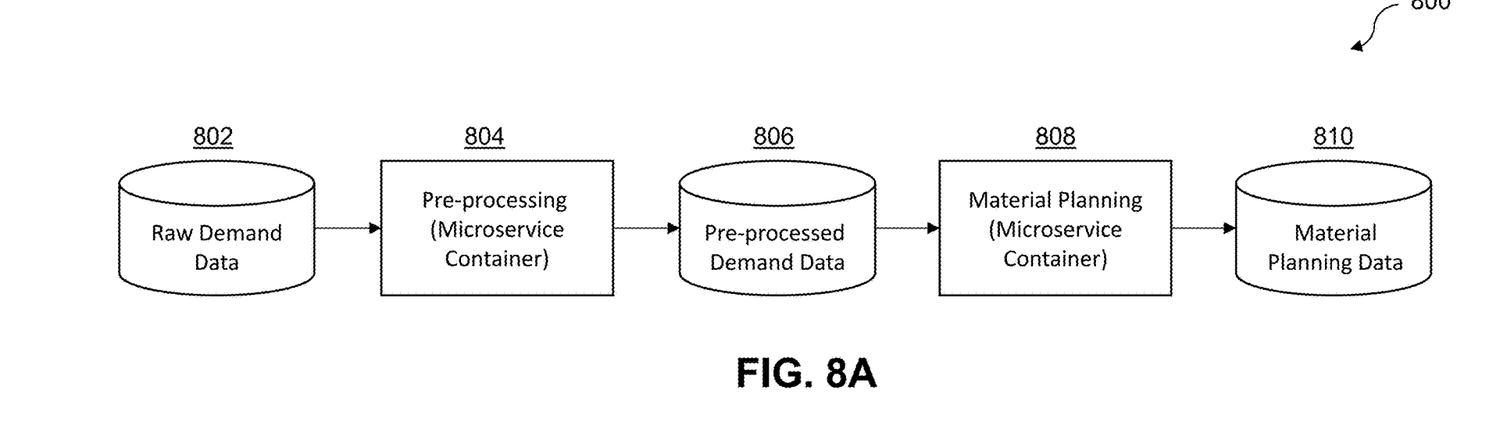
FIGS. 8A and 8B illustrate a use case with which a ring architecture-based microservice computing system according to an illustrative embodiment can be implemented.
Figure 8B:
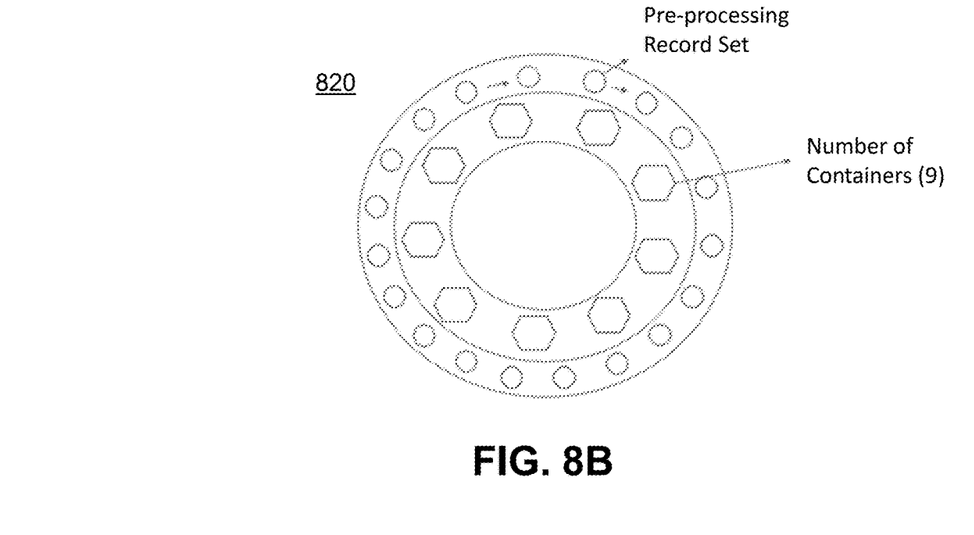

Consider a data pipeline implementation in a supply chain management use case. FIGS. 8A and 8B illustrate a use case with which a ring architecture-based microservice computing system according to an illustrative embodiment can be implemented. More particularly, consider a computing environment 800 in FIG. 8A wherein raw demand data 802 is obtained from a first datastore and pre-processed by a microservice container 804, and the pre-processed data is stored as pre-processed demand data 806 in a second datastore. Then, pre-processed demand data 806 is obtained from the second datastore and processed by a microservice container 808 that implements a material planning function. The data processed by microservice container 808 is then stored as material planning data 810 in a third datastore.

Assume that microservice container 808 that executes the material planning function is selectively configured to start at 3 pm. Thus, before that time, microservice container 804 has to pre-process raw demand data 802. Assuming pre-processing starts at 2:15 pm, pre-processing microservice container 804 should complete in no more than 44 minutes (less than 45 minutes because material planning execution begins at 3 pm).

In one or more illustrative embodiments, system 700 runs in a learn mode without a time bound. In the learn mode, in one illustrative embodiment, at least two containers are spun. In the learn mode, a system administrator is not enabled to enter a specific time for processing the total batch job.

When the job is executed, system 700 captures the time to process the records by each container. System 700 calculates the average time to process one record by a microservice container. Once the learned average time taken to process one record is computed, the learn mode ends. For example, assume system 700 learns the average time taken to process one raw demand data record by one microservice container is 250 seconds.

After the learn mode, system 700 can enter a run mode. Run mode, in one illustrative embodiment, can be entered by the system administrator changing job scheduler (e.g., part of 702 in system 700) to this mode to enable entry of the time for processing the job. The run mode can also occur automatically after the learn mode in some embodiments. In the above example, the system administrator can set the pre-processing microservice job to 40 minutes (i.e., building in a safety buffer so that material planning execution can start at 3 pm).

When the next scheduled time comes, system 700 performs the following:
 (i) obtains the total number of records to be processed, e.g., assume 5000K records of raw demand data 802 are to be pre-processed);
 (ii) receive input from the system administrator the time to complete the job, e.g., 40 minutes;
 (iii) look up average time to process one record determined in the learn mode, e.g., 250 seconds; and
 (iv) compute the number of microservice containers required to complete pre-processing using the following formula:

Number of containers required=Total number of records/(Average time to process one record*60*User entered time).

Thus, in the above example, the computation is as follows:

Number of containers required=5000K/(250*60*40)
 =8.333 rounded up to nine containers.

Thus, service/container manager 704 of system 700 causes deployment of nine containers in the ring architecture as illustrated in FIG. 8B as ring model 820. At runtime (in run mode), system 700 monitors the time to process a single record. If it is greater than the time computed in the learn mode (e.g., 250 seconds), system 700 recalculates the number of containers and adjusts the ring model (i.e., adding one or more microservice container instances). Advantageously, with the ring architecture, in run mode (at runtime), system 700 can insert a new microservice container at any point of time. Each microservice container will keep executing the records in a clockwise direction, until it has no further records to process.

Figure 9:
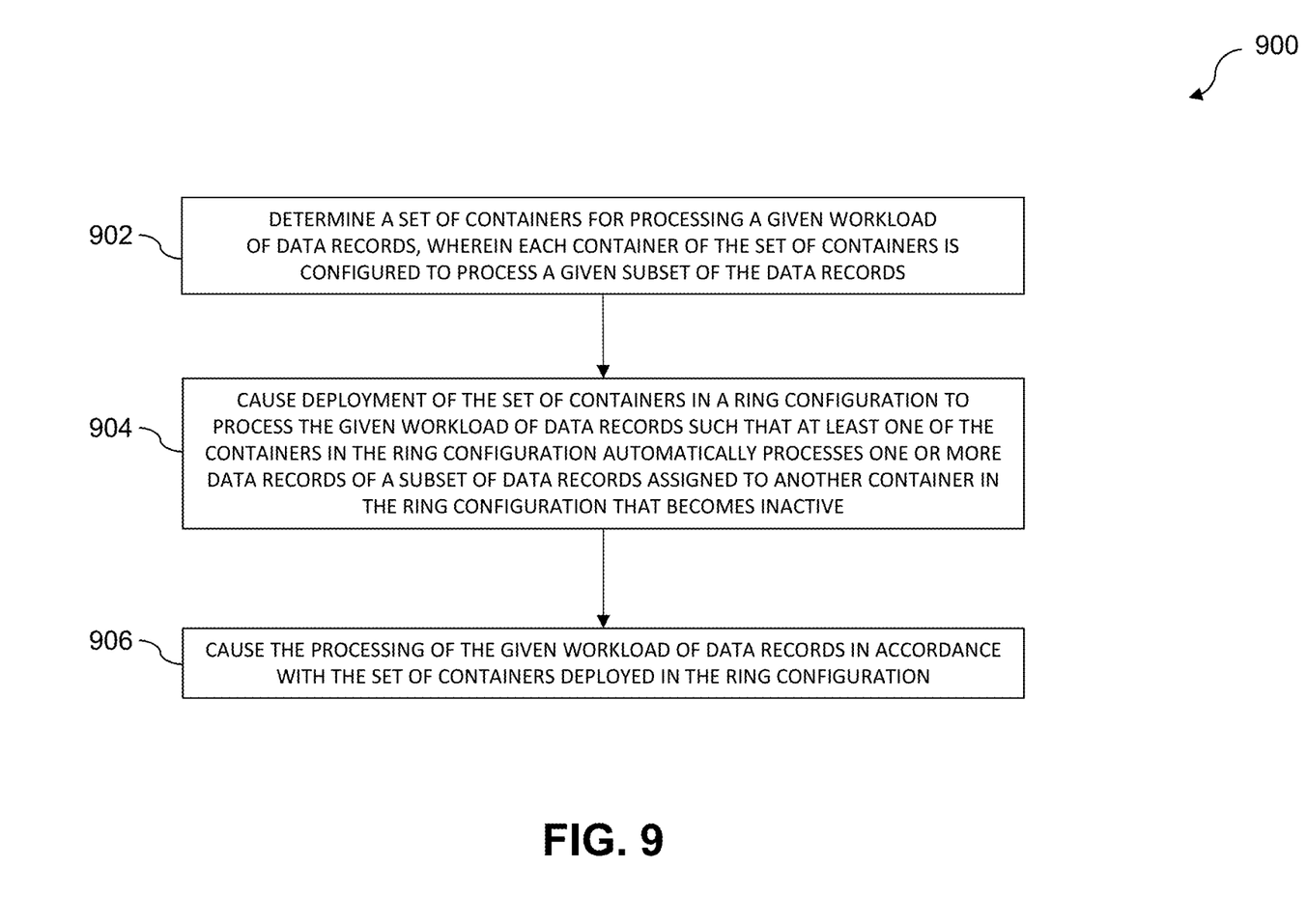
FIG. 9 illustrates a ring architecture-based workload management methodology according to an illustrative embodiment.

FIG. 9 illustrates a ring architecture-based workload management methodology (methodology 900) according to an illustrative embodiment. It is to be understood that, in illustrative embodiments, methodology 900 is performed by system 700 of FIG. 7.

As shown, step 902 determines a set of containers for processing a given workload of data records, wherein each container of the set of containers is configured to process a given subset of the data records. Step 904 causes deployment of the set of containers in a ring configuration to process the given workload of data records such that at least one of the containers in the ring configuration automatically processes one or more data records of a subset of data records assigned to another container in the ring configuration that becomes inactive. Step 906 then causes the processing of the given workload of data records in accordance with the set of containers deployed in the ring configuration.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for ring architecture-based workload management in a microservice computing environment will now be described in greater detail with reference to FIGS. 10 and 11. Although described in the context of systems/module/processes of FIGS. 1-9, these platforms may also be used to implement at least portions of other information processing systems in other embodiments.

Figure 10:
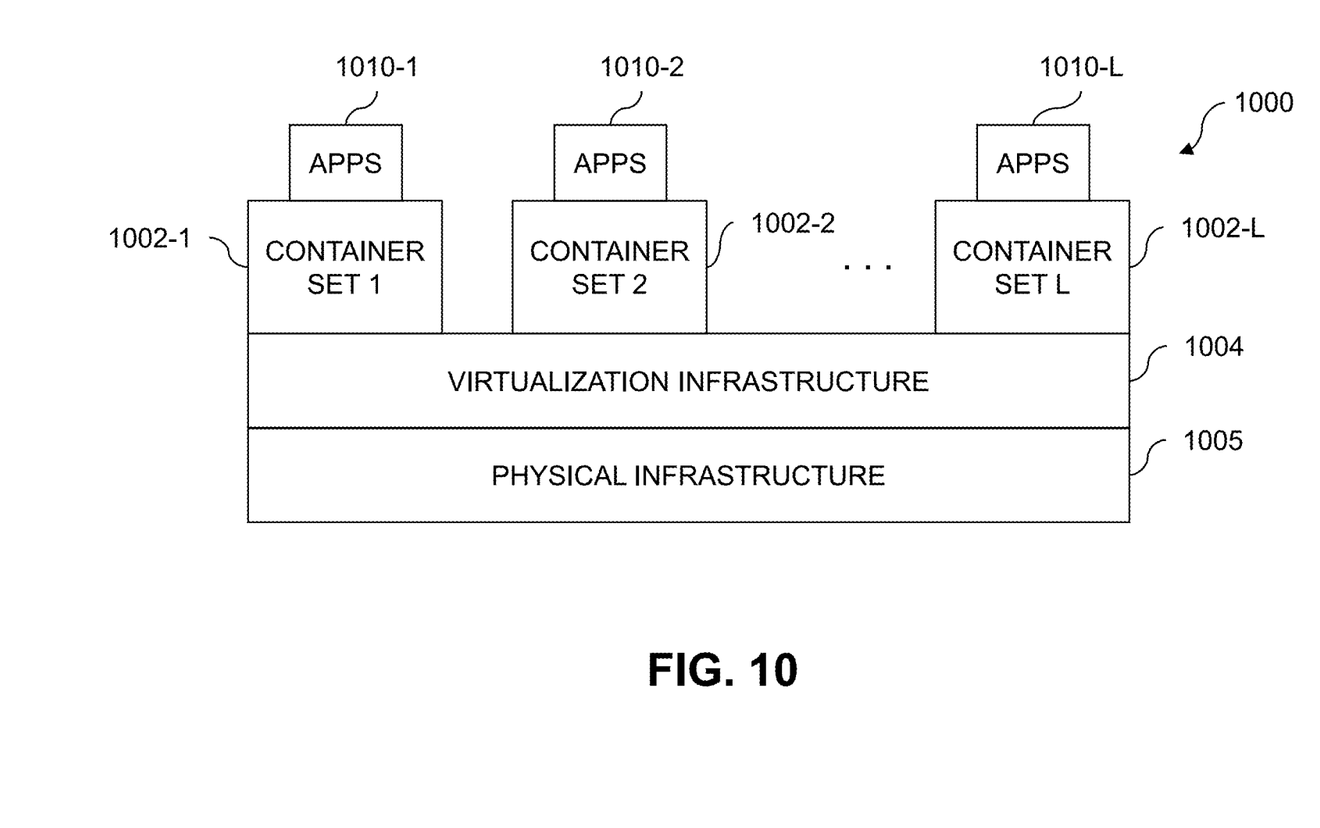
FIGS. 10 and 11 illustrate examples of processing platforms that may be utilized to implement at least a portion of an information processing system with ring architecture-based workload management functionalities according to one or more illustrative embodiments.
Figure 11:
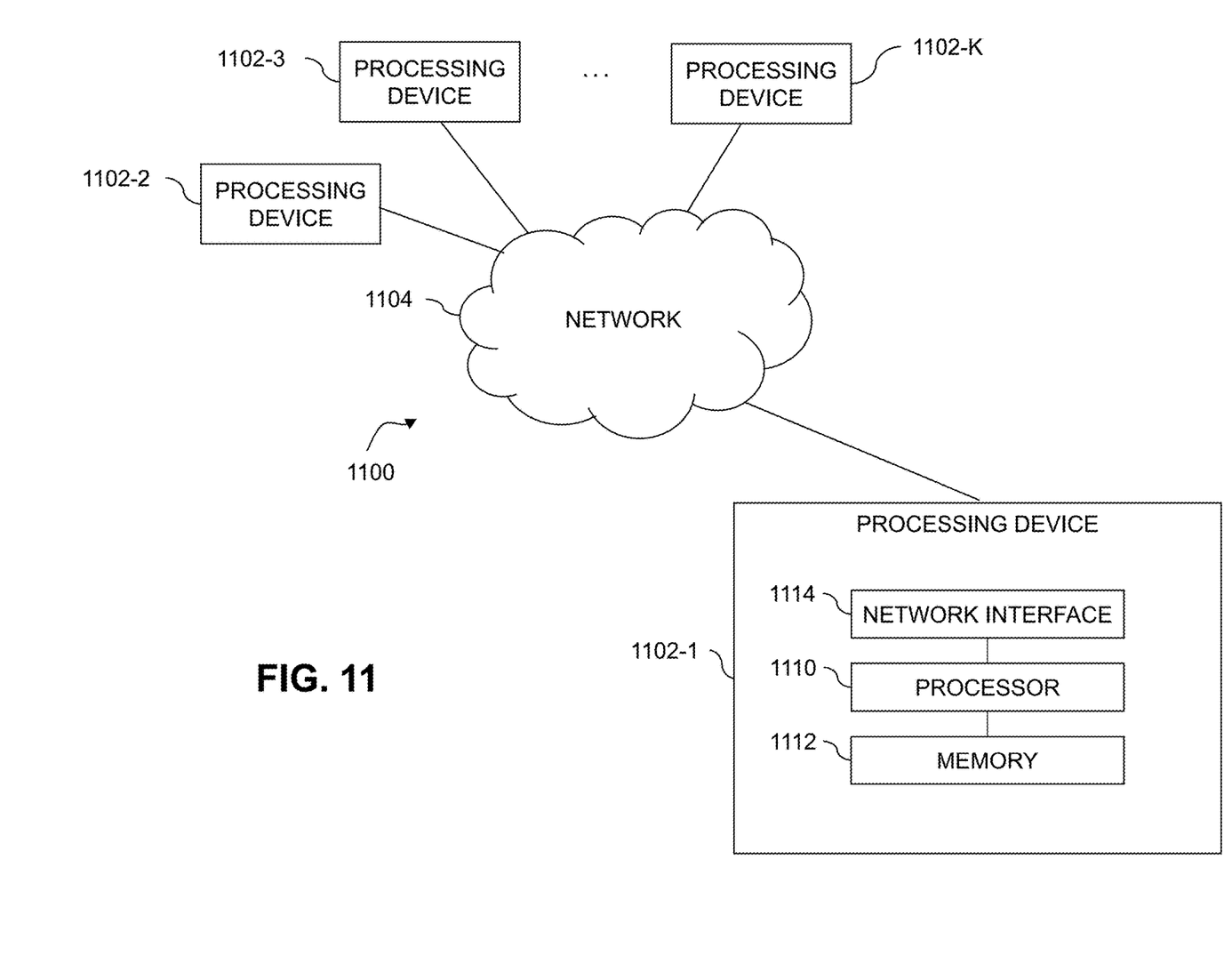

FIG. 10 shows an example processing platform comprising cloud infrastructure 1000. The cloud infrastructure 1000 comprises a combination of physical and virtual processing resources that may be utilized to implement at least a portion of system 700. The cloud infrastructure 1000 comprises multiple container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure.

The cloud infrastructure 1000 further comprises sets of applications 1010-1, 1010-2, . . . 1010-L running on respective ones of the container sets 1002-1, 1002-2, . . . 1002-L under the control of the virtualization infrastructure 1004. The container sets 1002 may comprise respective sets of one or more containers.

In some implementations of the FIG. 10 embodiment, the container sets 1002 comprise respective containers implemented using virtualization infrastructure 1004 that provides operating system level virtualization functionality, such as support for Kubernetes-managed containers.

As is apparent from the above, one or more of the processing modules or other components of system 700 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 700 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture or computer program products comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and systems/modules/processes of FIGS. 1-9 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity, PowerMax, PowerFlex (previously ScaleIO) or PowerStore storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processor coupled to at least one memory, the at least one processing platform, when executing program code, is configured to:
determine a set of containers for processing a given workload of data records, wherein each container of the set of containers is configured to process a given subset of the data records; and
cause deployment of the set of containers in a ring configuration to process the given workload of data records such that at least one of the containers in the ring configuration automatically processes one or more data records of a subset of data records assigned to another container in the ring configuration that becomes inactive.

2. The apparatus of claim 1, wherein at least some of the data records in the given workload of data records are to be sequentially processed.

3. The apparatus of claim 1, wherein at least some of the data records of the given workload of data records are to be processed in parallel.

4. The apparatus of claim 1, wherein determining the set of containers for processing the given workload of data records further comprises computing a number of containers to be included in the set of containers.

5. The apparatus of claim 4, wherein computing the number of containers to be included in the set of containers further comprises:
determining an average time to process a single data record of the given workload of data records;
obtaining a given time for completing the processing of the given workload of data records; and
dividing a total number of data records in the given workload of data records by a value computed from the average time to process a single data record and the given time for completing the processing of the given workload of data records.

6. The apparatus of claim 5, wherein determining the average time to process a single data record of the given workload of data records is performed in a selectable learn mode.

7. The apparatus of claim 6, wherein computing the number of containers to be included in the set of containers is performed in a selectable run mode.

8. The apparatus of claim 1, wherein each container of the set of containers is configured to execute a given microservice.

9. The apparatus of claim 8, wherein the given microservice is the same in each container of the set of containers.

10. The apparatus of claim 1, wherein the at least one processing platform, when executing program code, is further configured to cause the processing of the given workload of data records in accordance with the set of containers deployed in the ring configuration.

11. The apparatus of claim 10, wherein the at least one container in the ring configuration automatically processes the one or more data records of the subset of data records assigned to the other container in the ring configuration that has become inactive after the at least one container completes processing of a subset of data records assigned thereto.

12. The apparatus of claim 10, wherein processing the given workload of data records by the containers of the set of containers is performed in a given direction around the ring configuration.

13. The apparatus of claim 12, wherein processing the given workload of data records by the containers of the set of containers is performed by each container processing a next data record in the given direction of the ring configuration.

14. A method comprising:
determining a set of containers for processing a given workload of data records, wherein each container of the set of containers is configured to process a given subset of the data records; and
causing deployment of the set of containers in a ring configuration to process the given workload of data records such that at least one of the containers in the ring configuration automatically processes one or more data records of a subset of data records assigned to another container in the ring configuration that becomes inactive;
wherein the determining and the deployment causing are performed by a processing platform comprising at least one processor, coupled to at least one memory, executing program code.

15. The method of claim 14, wherein determining the set of containers for processing the given workload of data records further comprises computing a number of containers to be included in the set of containers.

16. The method of claim 15, wherein computing the number of containers to be included in the set of containers further comprises:
- determining an average time to process a single data record of the given workload of data records;
- obtaining a given time for completing the processing of the given workload of data records; and
- dividing a total number of data records in the given workload of data records by a value computed from the average time to process a single data record and the given time for completing the processing of the given workload of data records.

17. The method of claim 14, further comprising causing the processing of the given workload of data records in accordance with the set of containers deployed in the ring configuration.

18. The method of claim 17, wherein the at least one container in the ring configuration automatically processes the one or more data records of the subset of data records assigned to the other container in the ring configuration that has become inactive after the at least one container completes processing of a subset of data records assigned thereto.

19. A computer program product comprising a non-transitory processor-readable storage medium having stored therein program code of one or more software programs, wherein the program code when executed by at least one processing platform causes the at least one processing platform to:
- determine a set of containers for processing a given workload of data records, wherein each container of the set of containers is configured to process a given subset of the data records; and
- cause deployment of the set of containers in a ring configuration to process the given workload of data records such that at least one of the containers in the ring configuration automatically processes one or more data records of a subset of data records assigned to another container in the ring configuration that becomes inactive.

20. The computer program product of claim 19, further comprising causing the processing of the given workload of data records in accordance with the set of containers deployed in the ring configuration.

* * * * *